United States Patent
Saar et al.

(10) Patent No.: US 12,346,462 B2
(45) Date of Patent: Jul. 1, 2025

(54) TECHNIQUES FOR SECURING CONTENT TO BE PROCESSED USING UNIDIRECTIONAL ENCRYPTION

(71) Applicant: Kinsame Technologies (Information) Ltd., Magshimim (IL)

(72) Inventors: Tomer Saar, Hod Hasharon (IL); Yoni Donner, Rohnert Park, CA (US); Aviram Bar-Haim, Hod Hasharon (IL)

(73) Assignee: NACRE CAPITAL HOLDINGS LTD., Birkirkara (MT)

( * ) Notice: Subject to any disclaimer, the term of this patent is extended or adjusted under 35 U.S.C. 154(b) by 287 days.

(21) Appl. No.: 18/069,471

(22) Filed: Dec. 21, 2022

(65) Prior Publication Data

US 2024/0211610 A1   Jun. 27, 2024

(51) Int. Cl.
 *G06F 21/60* (2013.01)
(52) U.S. Cl.
 CPC .................. *G06F 21/602* (2013.01)
(58) Field of Classification Search
 CPC .................. G06F 21/60; G06F 21/602
 See application file for complete search history.

(56) References Cited

U.S. PATENT DOCUMENTS

| | | | |
|---|---|---|---|
| 7,227,908 B2 | 6/2007 | Suzuki et al. | |
| 7,630,511 B2 | 12/2009 | Zhao et al. | |
| 8,032,760 B2 | 10/2011 | Tuyls et al. | |
| 2007/0078817 A1 | 4/2007 | Girao et al. | |
| 2008/0228306 A1 | 9/2008 | Yetter et al. | |
| 2010/0014657 A1 | 1/2010 | Kerschbaum et al. | |
| 2010/0017870 A1 | 1/2010 | Kargupta | |

(Continued)

FOREIGN PATENT DOCUMENTS

| | | |
|---|---|---|
| CN | 112865958 A | 5/2021 |
| JP | 3979105 B2 | 9/2007 |
| JP | 2014206696 A | 10/2014 |

OTHER PUBLICATIONS

Mezzadri, Francesco. "How to generate random matrices from the classical compact groups." arXiv preprint math-ph/0609050 (2006).

(Continued)

*Primary Examiner* — Kristie D Shingles
(74) *Attorney, Agent, or Firm* — M&B IP Analysts, LLC

(57) ABSTRACT

Systems and methods for securing content using unidirectional encryption. A method includes obtaining a first transformed array created by applying a transformation process to an inference array, wherein the inference array is a reduced representation of media content created by embedding the media content, wherein the first transformed array preserves a dot product result of the inference array, wherein the transformation process is a unidirectional process such that attempting to reconstruct the media content using the first transformed array will result in different media content; determining a dot product result between the first transformed array and a second transformed array created using the transformation process; checking conditions using the dot product result between the first transformed array and the second transformed array; and determining a relationship between the first transformed array and the second transformed array based on the checking of the conditions.

18 Claims, 6 Drawing Sheets

(56) References Cited

U.S. PATENT DOCUMENTS

| | | | |
|---|---|---|---|
| 2012/0121194 A1 | 5/2012 | Yagnik | |
| 2021/0342677 A1* | 11/2021 | Dalli | G06N 3/082 |
| 2022/0066456 A1* | 3/2022 | Ebrahimi Afrouzi | G06F 3/04883 |
| 2022/0138532 A1* | 5/2022 | Dalli | G06N 3/048 706/27 |
| 2023/0146390 A1* | 5/2023 | Sadaka | G06T 5/60 345/611 |
| 2023/0245654 A1* | 8/2023 | Shrivastava | G10L 15/1822 704/243 |

OTHER PUBLICATIONS

Miao, Peihan, Sikhar Patranabis, and Gaven Watson. "Unidirectional updatable encryption and proxy re-encryption from ddh or lwe." Cryptology ePrint Archive (2022).

Wang, Yongjin & Hatzinakos, Dimitrios. (2010). On Random Transformations for Changeable Face Verification. IEEE transactions on systems, man, and cybernetics. Part B, Cybernetics : a publication of the IEEE Systems, Man, and Cybernetics Society. 41. 840-54. 10.1109/TSMCB.2010.2098439. https://www.researchgate.net/publication/49716561_On_Random_Transformations_for_Changeable_Face_Verification.

Y. Wang and K. N. Plataniotis, "Face Based Biometric Authentication with Changeable and Privacy Preservable Templates," 2007 Biometrics Symposium, 2007, pp. 1-6, doi: 10.1109/BCC.2007.4430530. https://ieeexplore.ieee.org/document/4430530.

International Search Report for PCT/IB2023/062643, dated Feb. 29, 2024. Searching Authority Israel Patent Office, Jerusalem, Israel.

Mezzadri F. How to generate random matrices from the classical compact groups. arXiv preprint math-ph/0609050. Sep. 18, 2006. < https://arxiv.org/pdf/math-ph/0609050> Sep. 18, 2006 (Sep. 18, 2006) the whole doc.

Written Opinion of the Searching Authority for PCT/IB2023/062643, dated Feb. 29, 2024. Searching Authority Israel Patent Office, Jerusalem, Israel.

\* cited by examiner

TECHNIQUES FOR SECURING CONTENT TO BE PROCESSED USING UNIDIRECTIONAL ENCRYPTION

TECHNICAL FIELD

The present disclosure relates generally to encryption, and more specifically to techniques for securing content using unidirectional encryption.

BACKGROUND

As the world becomes increasingly data-centric, more and more personal information about users is stored on computers. Some of this information is very private, and the average person would not want data containing that information to be exposed to the general public. However, in order to facilitate computer processing of personal data, a person may need to upload sensitive personal data despite the exposure risks. Likewise, even when the data is not particularly sensitive or embarrassing, users may still wish to minimize the exposure of their personal data.

To protect individuals, many companies implement strict policies on storing and using personal data. Further, lawmakers and regulators are becoming increasingly concerned about exposure of individuals' personal data and are acting accordingly. In 2018, Europe enacted the General Data Protection Regulation (GDRP) law, which gives individuals more control over their personal data and imposes strict requirements on organizations handling personal data. Failure to comply with these kinds of laws and regulations can carry massive penalties for companies.

In light of the ongoing needs noted above, it would be highly advantageous to have techniques that allow for sharing and utilizing data which minimize potential exposure of personal information which may be reflected in the shared data.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for comparing content secured using unidirectional encryption. The method comprises: obtaining a first transformed array, wherein the first transformed array is created by applying a transformation process to an inference array, wherein the inference array is a reduced representation of at least a portion of media content created by embedding the at least a portion of media content, wherein the first transformed array preserves a dot product result of the inference array, wherein the transformation process is a unidirectional process such that attempting to reconstruct the media content using the first transformed array will result in different media content; determining a dot product result between the first transformed array and a second transformed array, wherein the second transformed array is created using the transformation process; checking at least one condition using the dot product result between the first transformed array and the second transformed array; and determining a relationship between the first transformed array and the second transformed array based on the checking of the at least one condition.

Certain embodiments disclosed herein also include a non-transitory computer readable medium having stored thereon causing a processing circuitry to execute a process, the process comprising: obtaining a first transformed array, wherein the first transformed array is created by applying a transformation process to an inference array, wherein the inference array is a reduced representation of at least a portion of media content created by embedding the at least a portion of media content, wherein the first transformed array preserves a dot product result of the inference array, wherein the transformation process is a unidirectional process such that attempting to reconstruct the media content using the first transformed array will result in different media content; determining a dot product result between the first transformed array and a second transformed array, wherein the second transformed array is created using the transformation process; checking at least one condition using the dot product result between the first transformed array and the second transformed array; and determining a relationship between the first transformed array and the second transformed array based on the checking of the at least one condition.

Certain embodiments disclosed herein also include a system for comparing content secured using unidirectional encryption. The system comprises: a processing circuitry; and a memory, the memory containing instructions that, when executed by the processing circuitry, configure the system to: obtain a first transformed array, wherein the first transformed array is created by applying a transformation process to an inference array, wherein the inference array is a reduced representation of at least a portion of media content created by embedding the at least a portion of media content, wherein the first transformed array preserves a dot product result of the inference array, wherein the transformation process is a unidirectional process such that attempting to reconstruct the media content using the first transformed array will result in different media content; determine a dot product result between the first transformed array and a second transformed array, wherein the second transformed array is created using the transformation process; check at least one condition using the dot product result between the first transformed array and the second transformed array; and determine a relationship between the first transformed array and the second transformed array based on the checking of the at least one condition.

Certain embodiments disclosed herein also include a method for securing content using unidirectional encryption. The method comprises: embedding, at a first system, at least a portion of media content into an inference array, wherein the inference array is a reduced representation of the at least a portion of the media content; transforming, at the first system, the inference array into a first transformed array using a transformation process, wherein the first transformed array preserves a dot product result of the inference array, wherein the transformation process is a unidirectional process such that attempting to reconstruct the media content using the first transformed array will result in different media content; and sending, from the first system to a second system, the first transformed array for subsequent processing.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
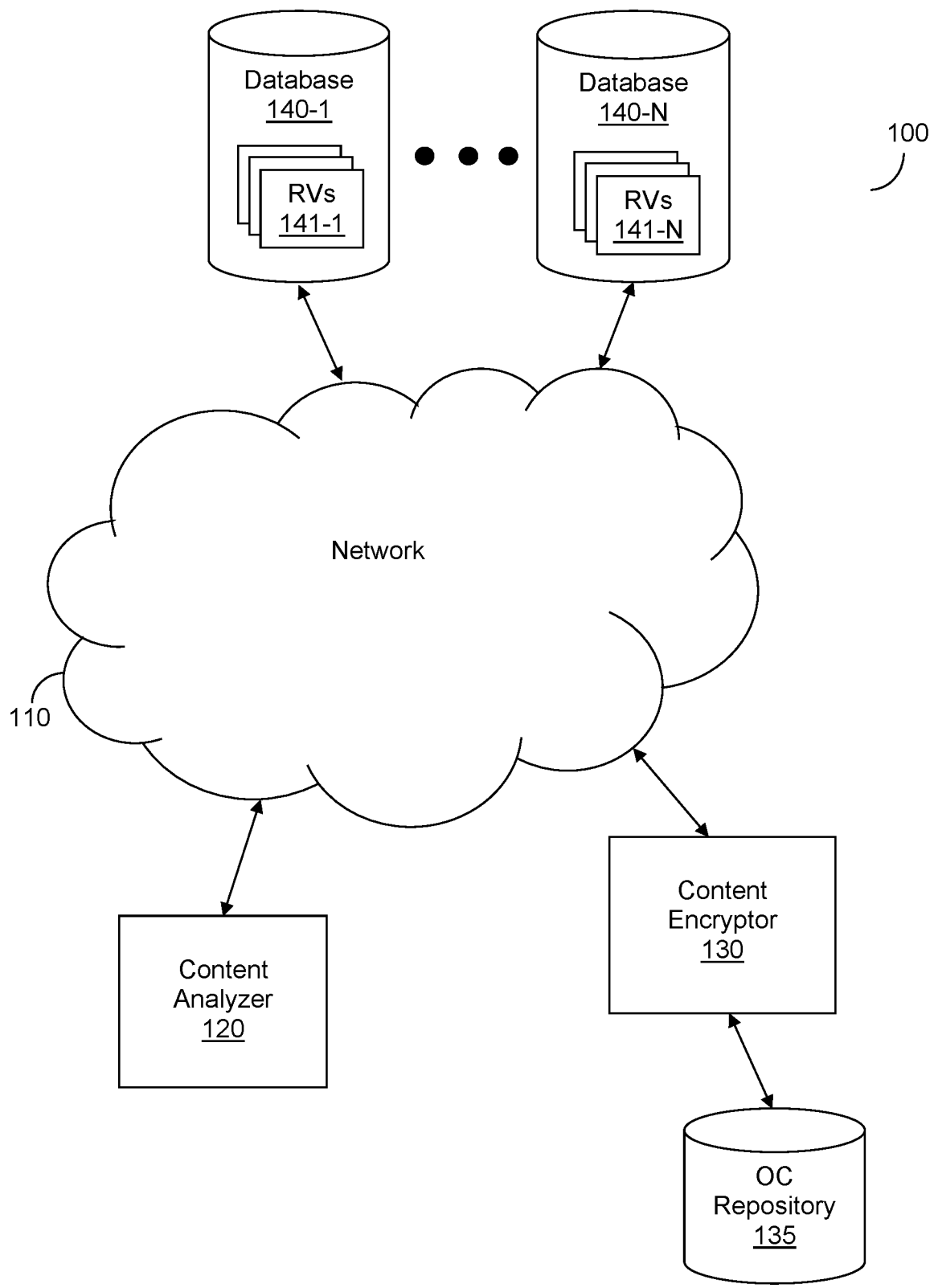
FIG. 1 is a network diagram utilized to describe various disclosed embodiments.

The various disclosed embodiments include a method and system for unidirectional encryption for media content such as images. An inference embedding is created based on inputs including original content in order to create an embedded representation of the original content. For example, an image may be embedded into one or more inference vectors representing certain aspects or features of the image. The inference vectors are encrypted using a unidirectional encryption process, thereby producing transformed vectors.

The transformed vectors retain one or more characteristics of the original content, but cannot be used to reconstruct the original content. In an embodiment, the transformed vectors preserve the dot product result of the pre-transformation inference vectors such that the result of applying a dot product operation (the result being hereinafter referred to as a "dot product result") between any two pre-transformation vectors matches the dot product result between their respective transformed (i.e., post-transformation) vectors. The transformed vectors may therefore be used checking conditions in order to derive some information related to the original images such as similarities between the original image of one user and original images of other users.

The disclosed embodiments provide techniques for unidirectionally encrypting content such as images or other visual content. The unidirectionally encryption utilized in accordance with various disclosed embodiments produces transformed vectors having the property that, even if a transformed vector could be decrypted in a manner that allows for reconstructing the same type of content (e.g., reconstructing an image based on an encrypted version of an image), the decrypted content would still be different from the original unencrypted content. For example, if the original content is an image, the original image is embedded and transformed into a transformed vector such that, even if the transformed vector were decrypted and utilized to construct another image, the decrypted image would not match the original image. In other words, a decrypted image produced using the transformed vector as described herein will be different from the original image utilized to create the transformed vector. Consequently, the transformed vectors may be shared and utilized by external systems without providing access to the underlying content.

Accordingly, the disclosed embodiments allow for encrypting content such as images containing personal information (e.g., images showing a person's face) that can be utilized for certain purposes without allowing direct access to the underlying personal information (e.g., the original images). As a non-limiting example, transformed vectors created using original images of users' faces can be sent for analysis of genetically similar users based on potential similarities between facial features of the users as reflected in the dot product result determined using the transformed vectors. Even if one of the transformed vectors is able to be used to reconstruct an image, the resulting reconstructed image would still not resemble the original image. More specifically, in accordance with various implementations, such a reconstructed image would appear as noise and would not appear as a "real" image.

The transformed vectors retain some characteristics of the original images and can therefore be used for such purposes, but are scrambled in a manner that prevents reconstruction of the original images themselves. To this end, in various embodiments, a transformation such as a random orthonormal transformation is performed on an inference vector of an original image in order to create a transformed vector that preserves content characteristics such as a dot product result of the inference vector while otherwise making it impossible to reconstruct into the original image using the transformed vector even if it were possible to reconstruct an image using the transformed vector. The dot product result may be utilized for subsequent processing stages involving comparisons between dot product results in order to produce meaningful results without requiring the original content itself.

Various disclosed embodiments may further utilize a random key for encryption, thereby allowing for producing different results for users with different keys. In this manner, users without the same key cannot obtain the original data from other users even if those users somehow access the transformed vectors. Moreover, in accordance with various disclosed embodiments, the original data may be stored in a secure location and referenced by index in order to further ensure improper access to the original data is avoided.

FIG. 1 shows an example network diagram 100 utilized to describe the various disclosed embodiments. In the example network diagram 100, a content analyzer 120, a content encryptor 130, and a plurality of databases 140-1 through 140-N (hereinafter referred to individually as a database 140 and collectively as databases 140, merely for simplicity purposes) communicate via a network 110. The network 110 may be, but is not limited to, a wireless, cellular or wired network, a local area network (LAN), a wide area network (WAN), a metro area network (MAN), the Internet, the worldwide web (WVW), similar networks, and any combination thereof.

The content analyzer 120 is configured to analyze content which is encrypted as described herein. More specifically, the content analyzer 120 may be configured to analyze transformed vectors created through unidirectional encryption and to utilize those transformed vectors for one or more purposes. In some embodiments, the content analyzer 120 is configured to compare between portions of content based on their respective untransformed or transformed vectors in order to identify similarities between the transformed vectors and, consequently, their respective underlying portions of content. In an example implementation, results of such analysis may be utilized to determine whether the vector or transformed vector of a person shown in an original image corresponding to the vector or transformed vector in the database genetically related to a person shown in one of the reference images by applying a dot product operation between transformed vectors and determining whether the dot product meets one or more conditions such as, but not limited to, being below a threshold.

The content encryptor 130 is configured to encrypt content such as images in a unidirectional manner such that the transformed vectors retain some information of the original content but cannot be used to reconstruct the original (pre-encryption) content. In an example implementation, the content encryptor 130 may be a user device having a software application (not shown) installed thereon, where the software application includes instructions that, when executed, configure the content encryptor 130 to unidirectionally encrypt content stored thereon as described herein. To this end, the content encryptor 130 may be, but is not limited to, a personal computer, a laptop, a tablet computer, a smartphone, a wearable computing device, or any other device capable of storing and processing the content to be encrypted.

In some implementations, the content encryptor 130 may be communicatively connected to an original content (OC) repository 135 which stores original content (not shown) such as, but not limited to, images. The content encryptor 130 may be configured to produce transformed vectors as described herein using any or all of the original content stored in the original content repository 135.

The transformed vectors created by the encryption system may be sent, for example over the network 110, to the content analyzer 120 for subsequent processing and use. As noted above, the transformed vectors cannot be used to reconstruct the original content such that the content analyzer 120 may be restricted from accessing the original content entirely. Instead, only a limited set of information about the content (for example, as realized via the transformed vectors created as discussed herein) is accessible to the content analyzer 120, thereby allowing for securing potential personal information of the original content on the content encryptor 130 and only exposing a limited portion of the information from that original content via the network 110 and/or the content analyzer 120.

The databases 140 may store data such as, but not limited to, reference vectors to be used for comparisons by the content analyzer 120, transformed vectors created by the content encryptor 130, or both. In the example diagram 300, any or all of the databases 140 include respective galleries of reference vectors 141, which are sets of transformed vectors derived using inference and transformation as described herein such that the transformed vectors preserve the dot product result, thereby allowing for identifying relationships between underlying content by determining dot product results between transformed vectors of respective portions of the underlying content and checking one or more conditions with respect to those dot product results. The reference vectors 141 stored in the databases 140 may be indexed, thereby allowing for convenient retrieval of appropriate vectors on demand.

It should be noted that the data stored in the databases 140 as illustrated in FIG. 1 include reference vectors for simplicity purposes, but other sizes and configurations of arrays (such as, but not limited to, M×N matrices, 3-dimensional constructs, etc.) may be utilized as references in accordance with the various disclosed embodiments.

Figure 2:
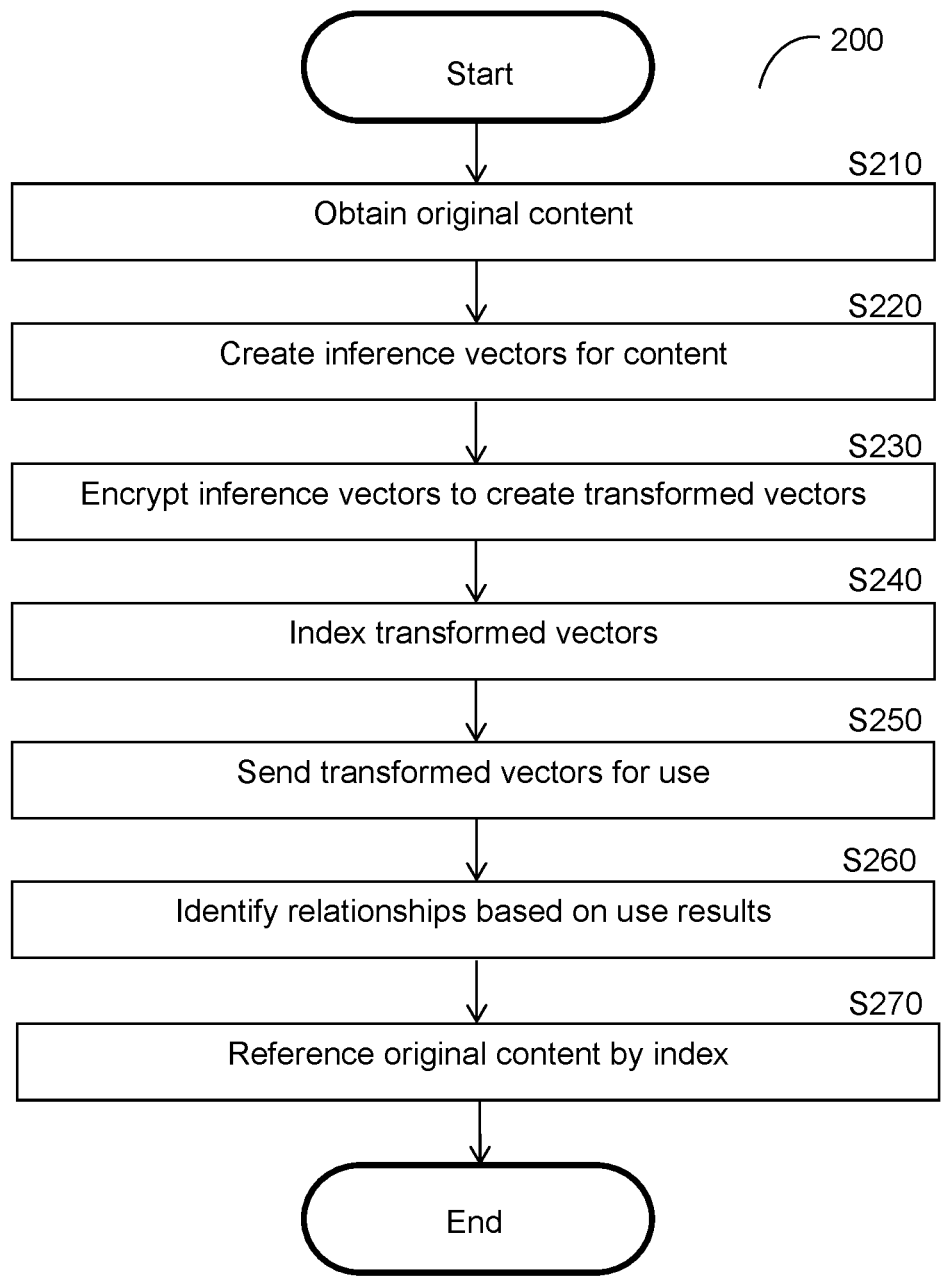
FIG. 2 is a flowchart illustrating a method for unidirectional encryption according to an embodiment.

FIG. 2 is an example flowchart 200 illustrating a method for unidirectional encryption according to an embodiment. In an embodiment, the method is performed by the content encryptor 130, FIG. 1.

At S210, original content to be encrypted is obtained. The original content may be, but is not limited to, one or more images or other media content. In an example implementation, the original content includes an image showing a person's face. The original content may be loaded from a storage or may be captured (e.g., using a camera of the device or system performing the method).

At S220, one or more inference vectors or inference arrays are generated by embedding the original content. In an embodiment, the embedding results in an inference vector including values representing respective features of the original content. The values are organized in a vector or other array, where the values correspond to respective variables representing discrete aspects or features of the original content. In some implementations, the embedding may be performed using one or more machine learning models trained to determine the values of the inference vectors based on input content. As a non-limiting example, a convolutional neural network may be trained for embedding and applied to input images in order to create respective inference vectors for those input images.

At S230, the inference vectors are transformed using encryption in order to create one or more respective transformed vectors. The transformed vectors are created such that the original content for which the transformed vectors are created cannot be derived from the transformed vectors without the decryption key, while preserving the relevant characteristics of the original content (e.g., preserving the dot product result such that the dot product result calculated between two pre-transformation vectors and the dot product result calculated between their respective post-transformation vectors is the same dot product result). In other words, an original image cannot be reconstructed using the transformed vector even if it is possible to construct some kind of image using the transformed vector, but the transformed vector can still be utilized for purposes such as checking conditions defined with respect to dot product results in order to determine the relationship between the underlying original content such as, but not limited to, the kin relationships between images or other discrete portions of the original content. Additionally, any different media content created using the transformed vectors cannot be used to reconstruct the original media content (i.e., the media content which was embedded and then encrypted in order to create the transformed vectors) without a decryption key of the original media content.

In a further embodiment, the transformed vectors are encrypted such that the original content cannot be reconstructed even if the algorithm used for the embedding is known to the entity attempting to decrypt the transformed vectors. Moreover, in some embodiments, the resulting transformed vectors only preserve the dot product result of the original inference vectors and do not preserve other characteristics of the original content represented in the original inference vectors.

In an embodiment, S230 includes encrypting the inference vectors using a unidirectional encryption process. Such a unidirectional encryption process may be an asymmetric encryption process requiring public and private keys for encryption and decryption, respectively.

In an embodiment, S230 includes applying an orthonormal transformation to the inference vectors. An example process for applying an orthonormal transformation which may be utilized to obtain transformed vectors having the properties discussed herein (i.e., preserves the dot product result but cannot be used to reconstruct the original content) which may be utilized in accordance with the disclosed embodiments is described further in the paper "How to generate random matrices from the classical compact groups" by Francesco Mezzadri, the contents of which are hereby incorporated by reference. In this regard, it has been identified that such an orthonormal transformation preserves the dot product result but transforms the original vectors (e.g., the inference vectors) in a manner that prevents reconstruction of the original content using the transformed vectors. The disclosed embodiments leverage this discovered property of orthonormal transformations in order to allow for determining relationships between content without requiring exposing the content itself.

In a further embodiment, the orthonormal transformation is a random orthonormal transformation. To this end, the key used for the encryption may be random. Using random keys further increases security of the encryption by preventing reconstruction of the original content due to another user accessing the computer code or otherwise knowing the algorithm used for the transformation. More specifically, even if another user has access to the computer code used to realize the transformation of the inference vectors, using a random key ensures that such a user does not have access to the key used for encrypting the vectors and, therefore, prevents that user from decrypting the transformed vectors back into the inference vectors. Example techniques for generating random orthonormal matrices which may be utilized in accordance with the disclosed embodiments are described further in the above-referenced paper "How to generate random matrices from the classical compact groups" by Francesco Mezzadri.

At S240, the transformed vectors may be indexed. The indices for the transformed vectors are unique, i.e., such that each potential index only corresponds to one of the transformed vectors. Moreover, since each transformed vector corresponds to a respective image (i.e., the image which was embedded and whose embedding was transformed to produce the transformed vector), the unique index for each transformed vector also uniquely corresponds to the respective image. In this manner, the transformed vectors can be later referenced by their indices without requiring providing information about the underlying content, for example, when two transformed vectors are determined to be siblings as determined by checking conditions with respect to dot product results (e.g., by determining if the dot product result between the transformed vectors is below a threshold), the comparing system may return a result such as "the images at index 3 and at index 9 are siblings."

At optional S250, the transformed vectors are sent for subsequent processing and use. In an embodiment, S250 includes sending the transformed vectors for subsequent processing (e.g., to the content analyzer 120, FIG. 1). The transformed vectors may be, but are not necessarily, sent over a network or other connection between systems. Because the transformed vectors cannot be used to reconstruct the original content, the transformed vectors can be sent securely in a manner that ensures that the original data cannot be compromised even if the transformed vectors are exposed to malicious actors. To this end, in some embodiments, only the transformed vector is sent for subsequent processing, and other information about the transformation such as the algorithm used for the transformation and the keys used are not sent or otherwise exposed to other systems (i.e., systems other than the system performing the transformation).

In an embodiment, the subsequent processing includes determining dot product results between pairs of transformed vectors and checking conditions with respect to the determined dot product results in order to identify relationships between transformed vectors. As a non-limiting example, when the dot product result between transformed vector A and transformed reference vector B is a scalar value below a threshold, it may be determined that transformed vectors A and B represent sibling underlying content. As another non-limiting example, when the dot product result between transformed vector A and transformed reference vector B is an array, a distance may be calculated for the array. If that calculated distance is below a threshold, it may be determined that transformed vectors A and B represent sibling underlying content.

It should be noted that at least some disclosed embodiments are not limited to determining relationships by comparing a dot product result to a threshold. Other conditions may be equally applied without departing from the scope of the disclosure. Different conditions may be utilized to check for different potential relationships without departing from the scope of the disclosure. As a non-limiting example, a condition for a particular relationship may require that the dot product result be divisible by 7 in order for the dot product result to indicate such a relationship. Further, in at least some implementations, multiple thresholds or ranges may be utilized, with different thresholds or ranges corresponding to different potential relationships. As a non-limiting example, a dot product result less than a first threshold may correspond to a sibling relationship of the subjects shown in respective underlying images, while a dot product result which is greater than the first threshold but less than a second threshold may correspond to a parent-child relationship. Because the dot product result is preserved in accordance with various disclosed embodiments, conditions may utilize any operations or other checks relying on dot product results in order to derive potential relationships between underlying content without requiring the underlying content itself.

In an example implementation, transformed vectors created based on images showing people are used to determine dot product results with other images showing people in order to determine if the person shown in the image used to create the transformed vector is genetically related to any of the people shown in the other images whose transformed vectors are used to determine respective dot products. To this end, in some implementations, sibling images may be determined to be images of individuals that are highly genetically similar, e.g., individuals having familial or like relations. An example method for subsequent processing of the transformed vectors is described below with respect to FIG. 4.

At S260, relationships between transformed vectors are identified based on the dot product results. The dot product can be any function for multiplying the transformed vectors. As a non-limiting example, a dot product that measures the similarity of vector elements to identify kin relationship between two persons may be utilized. The result of the dot product between the two items can be reference the original images by reporting the two indices of the items and the dot product result.

At optional S270, the original content may be referenced by their respective indices with respect to the results of the relationships determined between the transformed vectors in order to identify related portions of the original content (e.g., related images). The relationship may be utilized, for example, in order to identify a familial relationship between two people reflected in physical similarities demonstrated in respective pictures of those two people.

Figure 3:
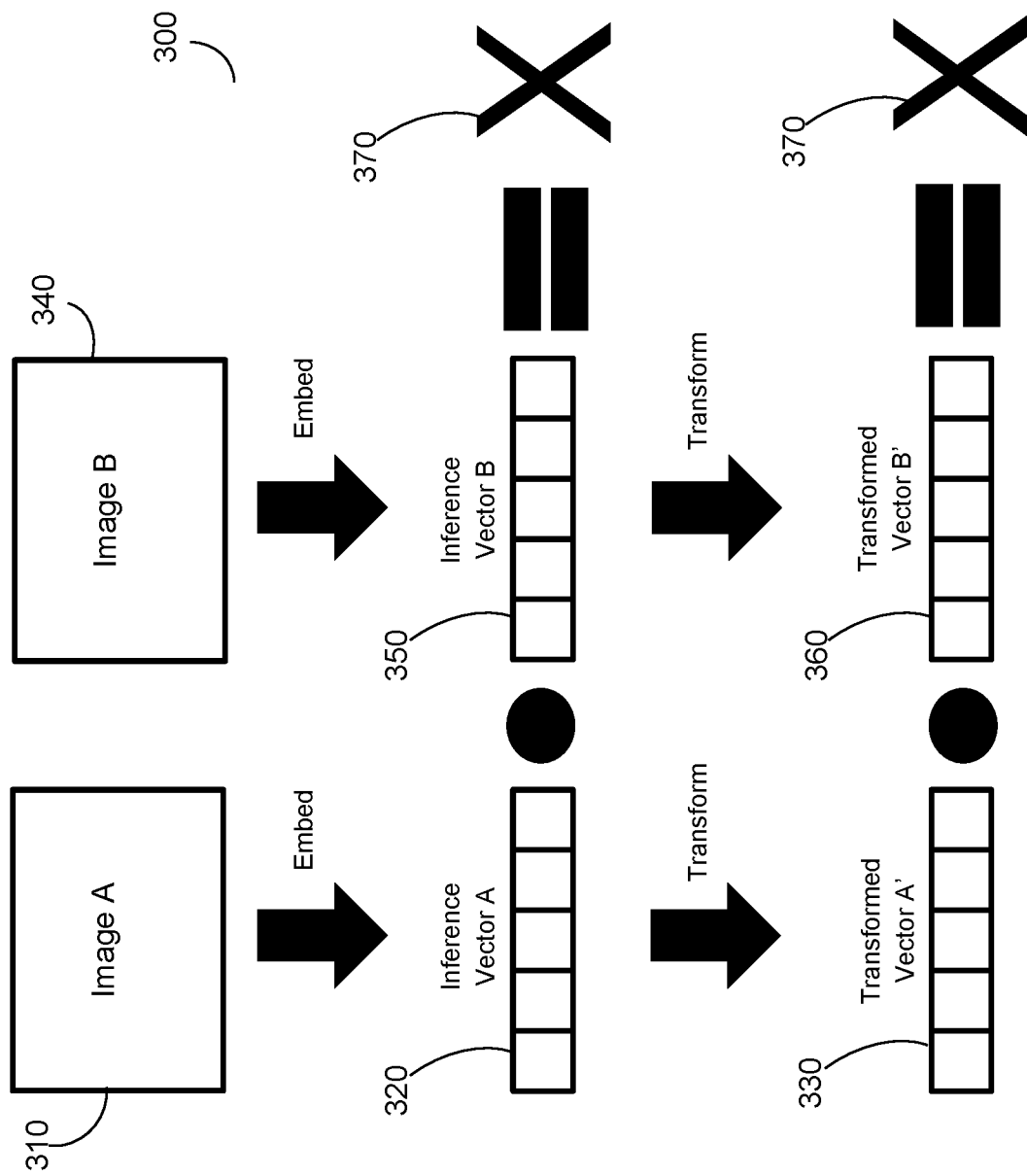
FIG. 3 is an illustration utilized to demonstrate preservation of content characteristics through transformation in accordance with various disclosed embodiments.

FIG. 3 is an example illustration 300 utilized to discuss an example embedding and transformation in accordance with various disclosed embodiments. Specifically, the example illustration 300 demonstrates preservation of a dot product result of an image through embedding and transformation of the image realized in accordance with the disclosed embodiments.

In FIG. 3, a first image A 310 is embedded in order to create an inference vector A 320 corresponding to the image A 310. The inference vector A 320 includes multiple values of respective variables representing different aspects or features of the image A 310.

The inference vector A 320 is transformed into a transformed vector A' 330 using a unidirectional encryption process as described herein such that the transformed vector A' 330 cannot be utilized to reconstruct the original image A 310 but preserves the dot product result of the inference vector A 320 with another vector.

Preservation of the dot product result is demonstrated, by way of example, using a second inference vector 350 of a second image B 340. The second inference vector 350 represents features or aspects of the image B 340, and may be an embedded version of the image B 350. A second transformed vector B' 360 is created using the same transformation process utilized to transform the inference vector A 320 into the transformed vector A' 330. More specifically, that transformation process is applied to the inference vector B 350 in order to create the transformed vector B' 360.

As illustrated in FIG. 3, applying a dot product operation between the inference vector A 320 and the inference vector B 350 results in a dot product result 370, which in this non-limiting example is a scalar value. Applying the same dot product operation between the transformed vector A' 330 and the transformed vector B' 360 likewise results in the scalar value dot product result 370. In other words, the scalar value 370, which is the dot product result determined by applying these dot product operations, is the same value when calculated between the pre-transformation vectors 320 and 350 as when calculated between the post-transformation vectors 330 and 360. That is, the dot product result 370 is preserved in the sense that the dot product result 370 calculated between first and second inference vectors matches the dot product result 370 calculated between their respective transformed vectors, each of which is created using the same transformation process.

It should be noted that FIG. 3 depicts various vectors 320, 330, 350, and 360, as well as a dot product result 370 that is a scalar value for simplicity, but that at least some disclosed embodiments are not limited to using vector representations of images and calculating scalar value dot product results. At least some disclosed embodiments may be realized using other size arrays (e.g., M×N matrices instead of the 1×N or N×1 matrix that is a vector, 3-dimensional arrays, or otherwise arrays with other numbers of dimensions), and the resulting dot product results between such other size arrays may also be an array instead of a scalar value. Use of such non-scalar dot product results may include, but is not limited to, calculating a distance for the array, where the calculated distance may be utilized to determine relationships between underlying content using one or more conditions with respect to such a distance (e.g., comparing the distance to a predetermined threshold value to determine whether two images are siblings). Alternatively, other conditions may be defined with respect to such non-scalar dot product results and checked in order to determine relationships in accordance with various disclosed embodiments.

In such implementations where the dot product result determined between arrays is itself an array, using the dot product may further include determining a distance of the array (e.g., a distance from a point of origin), where the distance is used to check for conditions. As a non-limiting example, when the dot product result between transformed arrays A' and B' is a 1×2 vector, the distance of the dot product result may be determined as a Euclidean distance from a reference such as, but not limited to, (0,0). It should be noted that other measurements of distance for 1×2 vectors, as well as various techniques to measure distance for other sizes of arrays, are known in the art and may be utilized in accordance with at least some disclosed embodiments. In a further example, the resulting distance is compared to a threshold and, if the distance is below the threshold, then the images A and B (corresponding to the transformed vector A' and the transformed vector B', respectively) may be determined as siblings. Likewise, other kin relationships may be determined (i.e., other than siblings), and each type of kin relationship may have one or more corresponding conditions to be met in order to identify such relationship.

Figure 4:
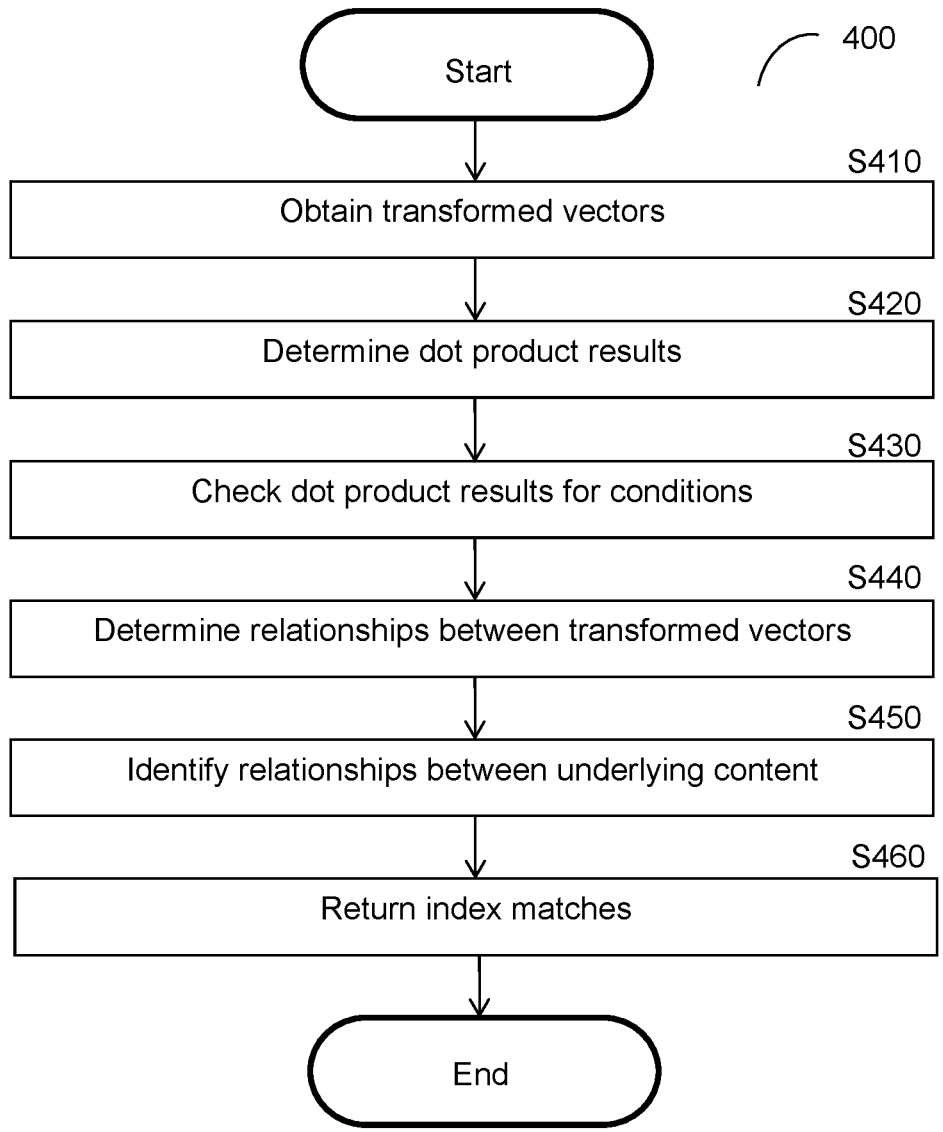
FIG. 4 is a method for utilizing transformed vectors according to an embodiment.

FIG. 4 is an example flowchart 400 illustrating a method for utilizing transformed vectors according to an embodiment. In an embodiment, the method is performed by the content analyzer 120, FIG. 1. Alternatively, the method may be performed by the content encryptor 130.

At S410, a first transformed vector (or first transformed array) is obtained. The transformed vector may be, for example, received (e.g., from the content encryptor 130) or may be retrieved (e.g., from one of the databases 140), and such receipt or retrieval may include another system transmitting the first transformed vector over a network connection. The transformed vector has the property that it retains some of the information represented in an original image but cannot be used to reconstruct the original image. In other words, attempting to reconstruct the underlying content using the transformed vector will result in different content, i.e., content that is different from the original underlying content. For example, when the underlying content is an image showing an individual's face, the reconstructed content may be a distorted image which does not show any individual's face. In various embodiments, S410 further includes storing the obtained transformed vectors.

In an embodiment, the transformed vector preserves a dot product result of two inference vectors of the original images. The dot product result is preserved such that the dot product result determined between the pre-transformation inference vectors matches the dot product result determined between the transformed (i.e., post-transformation) vectors. An example demonstration of preserving the dot product result is discussed further above with respect to FIG. 3.

At S420, a dot product result is determined between the transformed vector and each of one or more second transformed vectors. In an embodiment, S420 includes applying a dot product operation between the transformed vector and each other transformed vector (e.g., the transformed vector B' 360, FIG. 3). Each second transformed vector is created using the same transformation process used to create the transformed vector and may be, but is not limited to, a transformed reference image vector. For example, performing the same transformation process may include using the same encryption technique and using the same encryption key(s).

In some embodiments, the dot product result is a scalar value determined by taking the sum of products of the corresponding entries in two or more vectors. In other embodiments, the dot product result may be an array such as, but not limited to, a vector. Various dot product operations which may be utilized to determine the dot product result between vectors or other arrays are known in the art.

It should be noted that, in at least some embodiments, the dot product result could be realized as an array. In such embodiments, two dot product results may be determined to be identical when all values in one of the dot product results match the corresponding values (i.e., values in the same position within its respective matrix) in the other dot product result, and other relationships between the transformed vectors may be determined by checking conditions defined with respect to dot product results, values calculated using dot product results (e.g., distances), combinations thereof, and the like.

At S430, the determined dot product results are checked with respect to one or more conditions. Each dot product result is checked to determine, for example but not limited to, whether the dot product result indicates underlying content which is the same (e.g., having a dot product result of 0), highly similar so as to represent sibling subjects (e.g., having a dot product result below a threshold), other conditions, combinations thereof, and the like. As noted above, due to the properties of the transformed vectors as described herein, the dot product results are preserved during transformation. Consequently, any conditions defined with respect only to dot product results and without requiring knowledge of other characteristics of the underlying content may be checked using the transformed vectors described herein even without accessing the underlying content.

Accordingly, when the dot product result between a first transformed vector and a second transformed vector reflects no distance between the first transformed vector and a second transformed vector (as a non-limiting example, when the dot product result is a scalar value of 0 or an array including only 0 values), it can be determined that the first and second transformed vectors represent identical underlying content. Likewise, when the dot product result between a given first transformed vector and a second transformed vector below a threshold, it can be determined that the first and second transformed vectors represent highly similar underlying content (e.g., images of users who are genetically related but not the same person).

The threshold utilized for determining highly similar dot product results in accordance with at least some disclosed embodiments may be, but is not necessarily, predetermined, and may be set based on the use case. In particular, when used for genetic matching, the threshold may be relatively low. In this regard, it has been identified that the degree of matching based on images must be extremely high in order to determine genetic similarity. The relative proportion of similarity may need to be higher when matching between images as compared to, for example, matching between genetic sequences, since individuals with similar visual features (e.g., similar facial features) can have relatively high similarity when matching images as compared to their genetic sequence similarity.

At S440, relationships between pairs of transformed vectors are identified based on the checking of the conditions. The relationships may be, but are not limited to, identical matches (e.g., when the dot product results are identical), highly similar matches (e.g., when the dot product results are within a threshold distance of each other), and the like.

At S450, relationships between the underlying content represented by respective transformed vectors are determined based on the identified matches. In some implementations, vectors for which the dot product result is a scalar value of zero (0) may be determined to correspond to identical underlying content, and vectors for which the resulting dot product results (or respective distances calculated based on such dot product results) are below a threshold distance may be determined to be highly similar underlying content. In an example implementation, the relationship between underlying portions of content (e.g., underlying images) for which the resulting dot product result is below a threshold may be determined as siblings. In a further example implementation, sibling images may be determined to be images showing individuals which are genetically related.

At optional S460, index matches may be returned based on the identified relationships. As noted above, each transformed vector may be assigned a respective index for subsequent reference. The index matches may therefore be expressed, for example, by indicating that underlying content corresponding to those transformed vectors at their respective indices are either identical or siblings. As a non-limiting example, when an image assigned an index 4 is determined to be a sibling of an image assigned an index 9 based on a dot product comparison between the transformed vectors calculated using their respective original vectors inferenced from the underlying content, the index match returned may be "Index 4 is a sibling to index 9."

Alternatively or collectively, such dot product results may be checked to determine degrees of similarity (e.g., such that dot product results with smaller values or distances are more similar), and the transformed vectors may be ranked in order of similarity with respect to a given transformed vector. In such implementations, the index matches may include such a ranking of similar transformed vectors (and, consequently, similar portions of content).

The index matches may be sent (e.g., as a notification to a user device having stored thereon a gallery of indexed reference content) or otherwise used with respect to a gallery of indexed reference content, thereby allowing for determining which portions of the reference content relate to each other and how. As a non-limiting example, a device having the indexed reference images may receive a notification indicating the sibling relationship between indices 4 and 9, and the user of that device may view the images indexed at indices 4 and 9 in order to determine which individuals represented in those images are likely to be genetically similar.

In this manner, the indices facilitate maintaining privacy of the underlying content by allowing the system determining the relationships between transformed vectors to reference the underlying content without requiring exposure of any information about the underlying content itself nor the inference vector associated with the data. Instead, the system determining the relationships can receive indications of the respective indices for the transformed vectors and can return matching results uniquely identifying the relevant content by index and without requiring any information about the underlying content itself.

Figure 5:
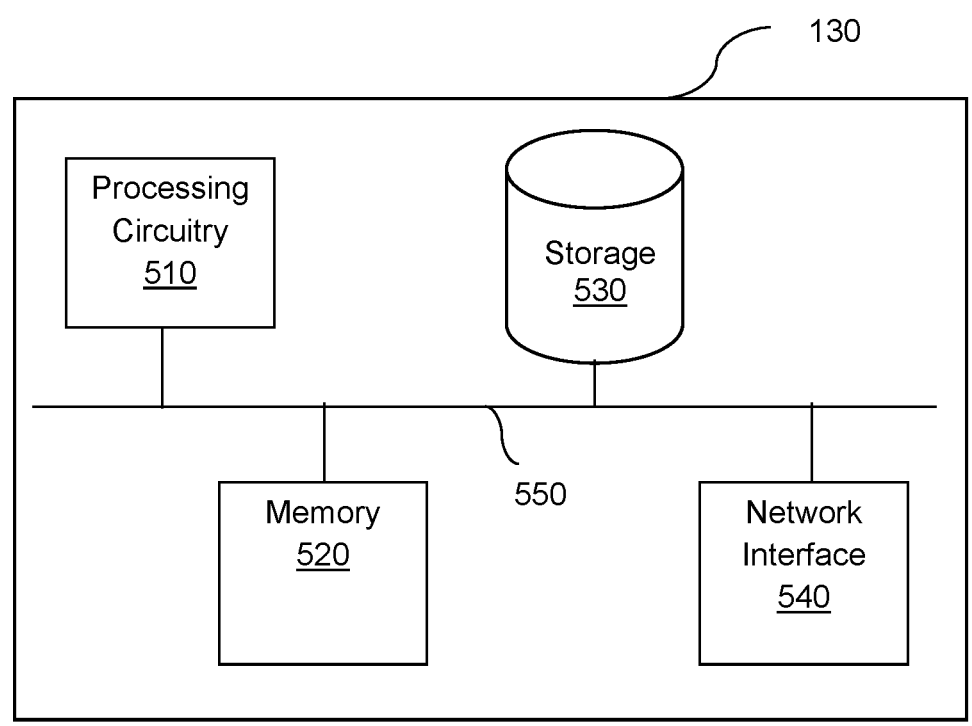
FIG. 5 is a schematic diagram of a content encryptor configured for unidirectional encryption according to an embodiment.

FIG. 5 is an example schematic diagram of a content encryptor 130 configured for unidirectional encryption according to an embodiment. The content encryptor 130 includes a processing circuitry 510 coupled to a memory 520, a storage 530, and a network interface 540. In an embodiment, the components of the content encryptor 130 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the content encryptor 130 to communicate with, for example, the content analyzer 120.

It should be understood that the embodiments described herein are not limited to the specific architecture illustrated in FIG. 5, and other architectures may be equally used without departing from the scope of the disclosed embodiments.

Figure 6:
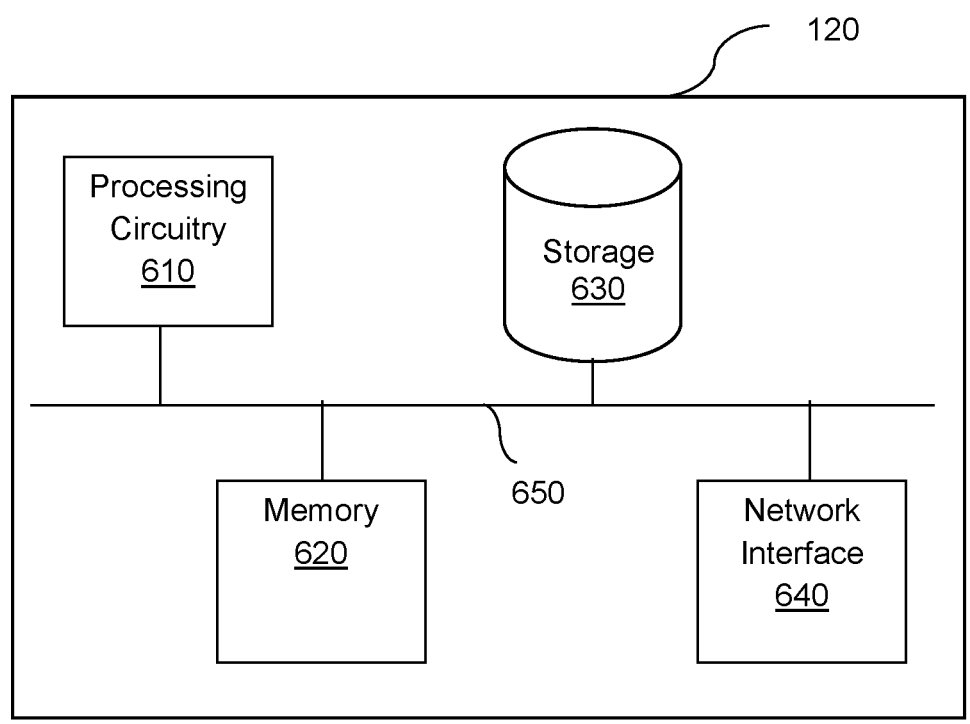
FIG. 6 is a schematic diagram of a content analyzer configured to use unidirectionally encrypted transformed vectors according to an embodiment.

FIG. 6 is an example schematic diagram of a content analyzer 120 configured to use unidirectionally encrypted transformed vectors according to an embodiment. The content analyzer 120 includes a processing circuitry 610 coupled to a memory 620, a storage 630, and a network interface 640. In an embodiment, the components of the content analyzer 120 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the content analyzer 120 to communicate with, for example, the content encryptor 130.

It should be understood that the embodiments described herein are not limited to the specific architecture illustrated in FIG. 6, and other architectures may be equally used without departing from the scope of the disclosed embodiments.

It should be noted that various disclosed embodiments are described with respect to using vectors (i.e., $1 \times N$ or $N \times 1$ arrays), but that the disclosed embodiments are not necessarily limited as such. Arrays of other sizes (e.g., $M \times N$ matrices, 3-dimensional arrays, or other N-dimensional arrays) may equally be utilized without departing from the scope of the disclosure. Accordingly, the inference vectors and the transformed vectors may be realized as inference arrays and transformed arrays, respectively, without departing from the scope of the disclosure.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for comparing content secured using unidirectional encryption, comprising:
   obtaining a first transformed array, wherein the first transformed array is created by applying a transformation process to an inference array, wherein the inference array is a reduced representation of at least a portion of media content created by embedding the at least a portion of media content, wherein the first transformed array preserves a dot product result of the inference array, wherein the transformation process is a unidirectional process such that attempting to reconstruct the media content using the first transformed array will result in different media content;
   determining a dot product result between the first transformed array and a second transformed array, wherein the second transformed array is created using the transformation process;
   checking at least one condition using the dot product result between the first transformed array and the second transformed array; and
   determining a relationship between the first transformed array and the second transformed array based on the checking of the at least one condition.

2. The method of claim 1, wherein obtaining the first transformed array further comprises:
   receiving the first transformed array over a network connection.

3. The method of claim 1, wherein the inference array is a first inference array, wherein the dot product result of the first inference array is preserved by the first transformation array such that a dot product result as determined between the first inference array and a second inference array matches the dot product result as determined between the first transformed array and the second transformed array, wherein the second transformed array is created by applying the transformation process to the second inference array.

4. The method of claim 1, wherein the second transformed array is assigned a respective index of a plurality of indices, further comprising:
   returning an index match for the first and second transformed arrays, wherein the index match indicates the index of the second transformed array.

5. The method of claim 1, wherein the relationship between the first transformed array and the second transformed array is determined as siblings when the dot product determined between the first transformed array and the second transformed array is below a threshold.

6. The method of claim 1, wherein the different media content cannot be used to reconstruct the at least a portion of media content without a decryption key of the at least a portion of media content.

7. A non-transitory computer readable medium having stored thereon instructions for causing a processing circuitry to execute a process, the process comprising:
   obtaining a first transformed array, wherein the first transformed array is created by applying a transformation process to an inference array, wherein the inference array is a reduced representation of at least a portion of media content created by embedding the at least a portion of media content, wherein the first transformed array preserves a dot product result of the inference array, wherein the transformation process is a unidirectional process such that attempting to reconstruct the media content using the first transformed array will result in different media content;
   determining a dot product result between the first transformed array and a second transformed array, wherein the second transformed array is created using the transformation process;
   checking at least one condition using the dot product result between the first transformed array and the second transformed array; and
   determining a relationship between the first transformed array and the second transformed array based on the checking of the at least one condition.

8. A system for unidirectional encryption, comprising:
   a processing circuitry; and
   a memory, the memory containing instructions that, when executed by the processing circuitry, configure the system to:
   obtain a first transformed array, wherein the first transformed array is created by applying a transformation process to an inference array, wherein the inference array is a reduced representation of at least a portion of media content created by embedding the at least a portion of media content, wherein the first transformed array preserves a dot product result of the inference array, wherein the transformation process is a unidirectional process such that attempting to reconstruct the media content using the first transformed array will result in different media content;
   determine a dot product result between the first transformed array and a second transformed array, wherein the second transformed array is created using the transformation process;

check at least one condition using the dot product result between the first transformed array and the second transformed array; and determine a relationship between the first transformed array and the second transformed array based on the checking of the at least one condition.

9. The system of claim 8, wherein the system is further configured to:

receive the first transformed array over a network connection.

10. The system of claim 8, wherein the inference array is a first inference array, wherein the dot product result of the first inference array is preserved by the first transformation array such that a dot product result as determined between the first inference array and a second inference array matches the dot product result as determined between the first transformed array and the second transformed array, wherein the second transformed array is created by applying the transformation process to the second inference array.

11. The system of claim 8, wherein the second transformed array is assigned a respective index of a plurality of indices, wherein the system is further configured to:

return an index match for the first and second transformed arrays, wherein the index match indicates the index of the second transformed array.

12. The system of claim 8, wherein the relationship between the first transformed array and the second transformed array is determined as siblings when the dot product determined between the first transformed array and the second transformed array is below a threshold.

13. The system of claim 8, wherein the different media content cannot be used to reconstruct the at least a portion of media content without a decryption key of the at least a portion of media content.

14. A method for securing content using unidirectional encryption, comprising:

embedding, at a first system, at least a portion of media content into an inference array, wherein the inference array is a reduced representation of the at least a portion of the media content;

transforming, at the first system, the inference array into a first transformed array using a transformation process, wherein the first transformed array preserves a dot product result of the inference array, wherein the transformation process is a unidirectional process such that attempting to reconstruct the media content using the first transformed array will result in different media content; and sending, from the first system to a second system, the first transformed array for subsequent processing, wherein the subsequent processing includes determining a dot product result between the first transformed array and a second transformed array, wherein the second transformed array is created using the transformation process.

15. The method of claim 14, wherein the inference array is a first inference array, wherein the dot product result of the first inference array is preserved by the first transformation array such that a dot product result as determined between the first inference array and a second inference array matches the dot product result as determined between the first transformed array and the second transformed array, wherein the second transformed array is created by applying the transformation process to the second inference array.

16. The method of claim 14, wherein the inference array is a first inference array, further comprising:

creating a second transformed array by transforming a second inference array using the transformation process; and indexing the second transformed array by assigning a respective index of a plurality of indices to the second transformed array.

17. The method of claim 16, further comprising:

receiving an index match, wherein the index match is determined based on a relationship between the first transformed array and the second transformed array by checking at least one condition with respect to the dot product result determined between the first transformed array and the second transformed array.

18. The method of claim 14, wherein only the first transformed array is sent for subsequent processing.

* * * * *